United States Patent [19]

Wong

[11] Patent Number: 5,104,295
[45] Date of Patent: Apr. 14, 1992

[54] ELECTRIC AIR PUMP WITH PHOTO-ELECTRIC CUTOFF OF PRESSURE DIAL

[76] Inventor: Alex Y. K. Wong, 1A, Marigold Garden, 12-14 Marigold Rd., Yau Yat Chuen, Kln., Hong Kong

[21] Appl. No.: 605,652

[22] Filed: Oct. 30, 1990

[51] Int. Cl.⁵ .............................................. F04B 49/06
[52] U.S. Cl. ..................................... 417/44; 417/234; 73/705
[58] Field of Search .................... 417/44, 234; 73/705

[56] References Cited

U.S. PATENT DOCUMENTS 4,300,548 11/1981 Jones ..................................... 73/705
4,614,479 9/1986 Liu ....................................... 417/234

FOREIGN PATENT DOCUMENTS 0193043 8/1986 Japan ..................................... 73/705
815116 6/1957 United Kingdom .
1449776 9/1976 United Kingdom .
2157775 10/1985 United Kingdom .

Primary Examiner—Richard A. Bertsch
Assistant Examiner—David W. Scheuermann
Attorney, Agent, or Firm—Fredrikson & Byron

[57] ABSTRACT

A vehicle tire compressor driven by attachment to the battery of a vehicle has a pressure gauge determining the output pressure. The gauge has a moving indicator indicating pressure on a dial. A photoelectric sensor can be adjustably positioned relative the dial to a pre-selected pressure such that, when the moving indicator indicates the said pre-selected pressure, the photoelectric sensor output will change, means being provided to detect this change and stop further operation of the compressor.

3 Claims, 4 Drawing Sheets

ELECTRIC AIR PUMP WITH PHOTO-ELECTRIC CUTOFF OF PRESSURE DIAL

This invention relates to vehicle accessories and in particular an air compressor for inflating or re-inflating the pneumatic tires of vehicles.

BACKGROUND TO THE INVENTION

Such compressors are well-known and generally comprise an electric motor which drives a suitable air compressor using the electrical energy from the vehicle's own electrical supply system. This is usually achieved by means of a plug which can fit into the cigar lighter of a vehicle to connect the compressor to the vehicle's battery.

A pressure gauge can be provided on the outlet line from the compressor so that the user can judge the air pressure which the tire is being inflated. This requires careful attention on the part of the user, however, to watch the pressure and ensure that the stops the inflation at the right moment.

It is an object of the present invention to avoid this problem and to allow the user to pre-set a desired inflation pressure and have the compressor stop at that point.

BRIEF SUMMARY OF THE INVENTION

According to the invention, there is provided a vehicle compressor comprising an electrically operated compressor, means for driving the compressor from the vehicle's electrical supply, an outlet line from the compressor to a vehicle tire, a pressure gauge for reading the pressure in the said outlet line, the pressure gauge including a dial and a moving indicator to indicate instantaneous pressure, photoelectric sensing means for sensing the alignment of the dial with a particular pressure, means for deactivating the compressor when the said photoelectric sensing means detect the alignment of the dial with that pressure, and means for adjusting the position of the photoelectric sensing means relative the dial so as to pre-set a particular chosen final pressure.

With such an arrangement the user can therefore pre-set the photoelectric sensing means to a particular chosen final inflation pressure and then as the pressure increases the indicator will move relative the dial to a point where it is detected by the photoelectric means in alignment with a particular pre-chosen pressure and at this point further inflation will automatically be stopped.

The pressure gauge itself can be largely conventional and as such can comprise a circular dial with appropriate radial markings indicating pressure and a rotatably mounted pointer whose tip moves round the dial according to the pressure sensed.

The pressure can be sensed conventionally by means of a bellows unit whose expansion and retraction is converted to rotary movement to drive the dial but that arrangement is entirely conventional. According to the invention, photoelectric means are provided to detect the moment when the pointer is aligned with a particular pressure around the dial.

In one preferred embodiment of the invention the photoelectric means will include a photoelectric sensor mounted on a member which is moveable to adjust its position relative the dial and which detects the light passing into a small opening in an enclosure, that opening being positioned close to the porter as it moves relative the dial, so that the pointer has the effect of largely obscuring the opening, and so suddenly and dramatically reducing the light entering the enclosure and received by the photoelectric sensor once the pointer becomes aligned and in particular orientation. To enhance the overall effect it is desirable to provide suitable illumination of the general area of the dial so that normally the photoelectric detector will receive a particular level of light radiation which will suddenly be reduced dramatically as the pointer becomes aligned with the particular pre-set pressure and it is this change in the amount of light which the photoelectric means will detect and electrically one can then stop further operation of the compressor.

It is an important advantage of the invention that one can add the photoelectric means to what can otherwise be a conventional pressure gauge.

Generally speaking, the above arrangement is preferred to an arrangement whereby the pointer actually interrupts the direct supply of a light beam from a light source to the detector since, although that latter arrangement is possible according to the invention, it will involve significant changes in the construction of pressure gauge itself.

BRIEF DESCRIPTION OF THE DRAWINGS

The invention will now be described, by way of example, with reference to the accompanying drawings, in which.

DESCRIPTION OF THE PREFERRED EMBODIMENT

Figure 1:
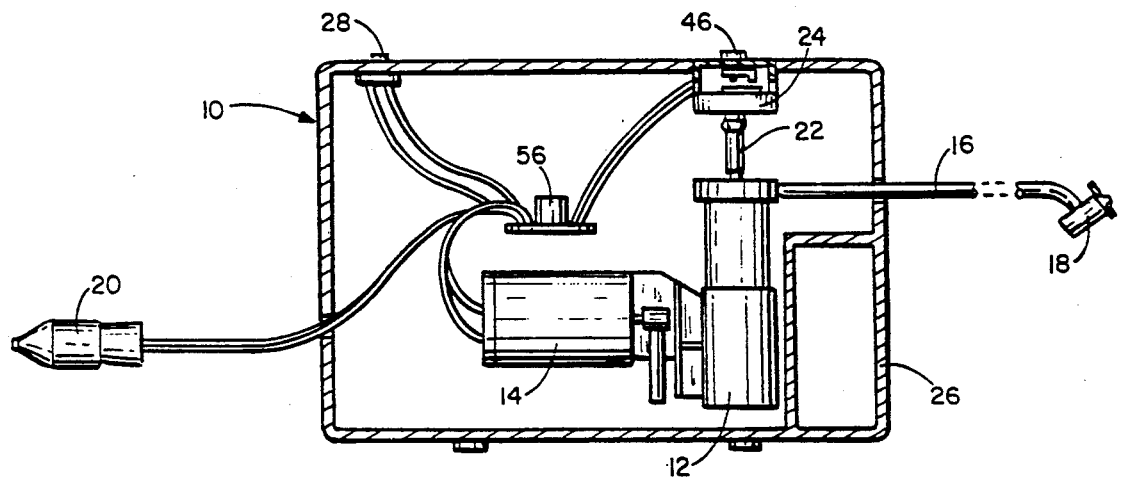
FIG. 1 is a diagrammatic view of a car tire compressor according to the invention.

The car compressor 10 shown in FIG. 1 includes an air compressor 12 driven by an electric motor 14. The outlet from the air compressor passes to a flexible supply tube 16 and can be attached to a pneumatic tire by means of a fitting 18. The compressor motor tube 16 and fitting 18 are entirely conventional and no further description thereof is believed to be necessary.

The supply to the electrical motor 14 is derived from a socket 20 which can fit in the cigar lighter outlet on a vehicle dashboard. Fitting 20 is again entirely conventional and no further description is believed to be necessary.

A branch pipe 22 is derived from the output side of the compressor 12 and passes to a pressure gauge 24 which will be described in more detail in due course. The pressure gauge 24 registers the output pressure from the compressor 12 and this corresponds to the pressure within the pneumatic tire being inflated and so the gauge 24 provides a reading showing the actual instantaneous inflation pressure of the tire.

The various operating components of the car compressor 10 are housed in a suitable casing 26. The housing also carries a master on/off switch 28.

Figure 2:
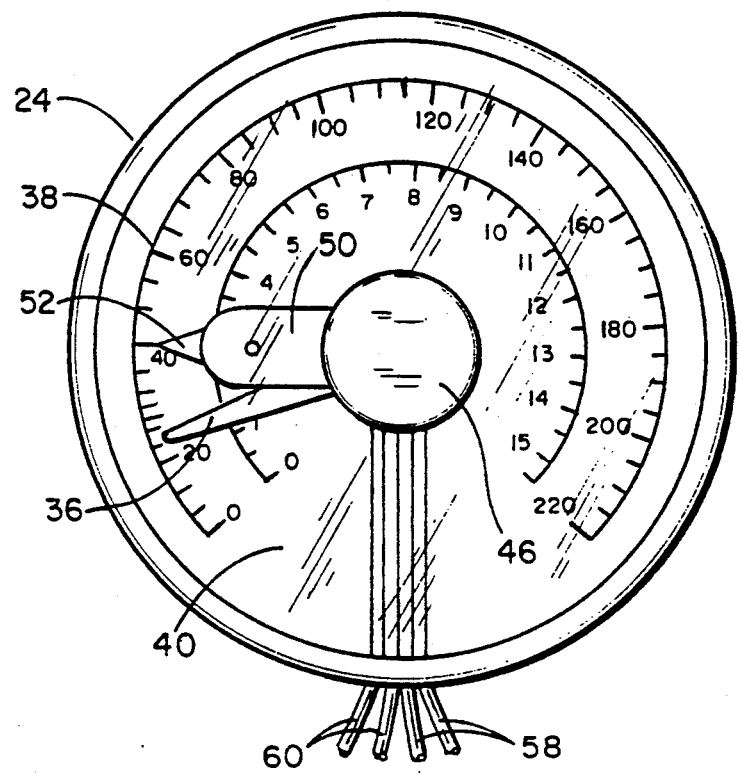
FIG. 2 is an enlarged plan view of the pressure gauge used in the car compressor shown in FIG. 1.
Figure 3:
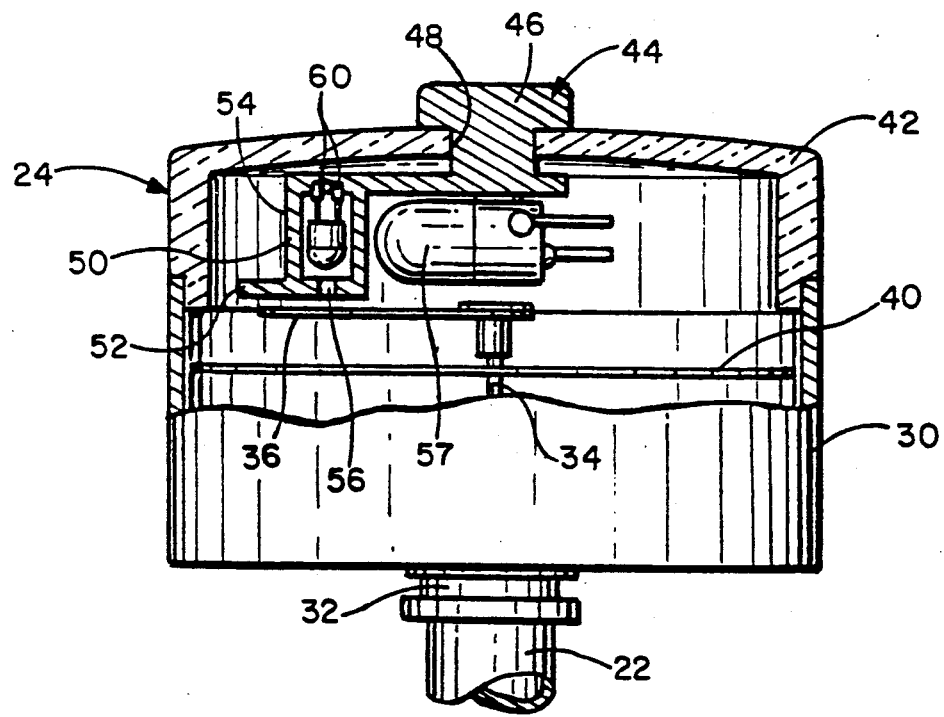
FIG. 3 is an upright part-sectional, part-elevation of the pressure gauge.
Figure 5:
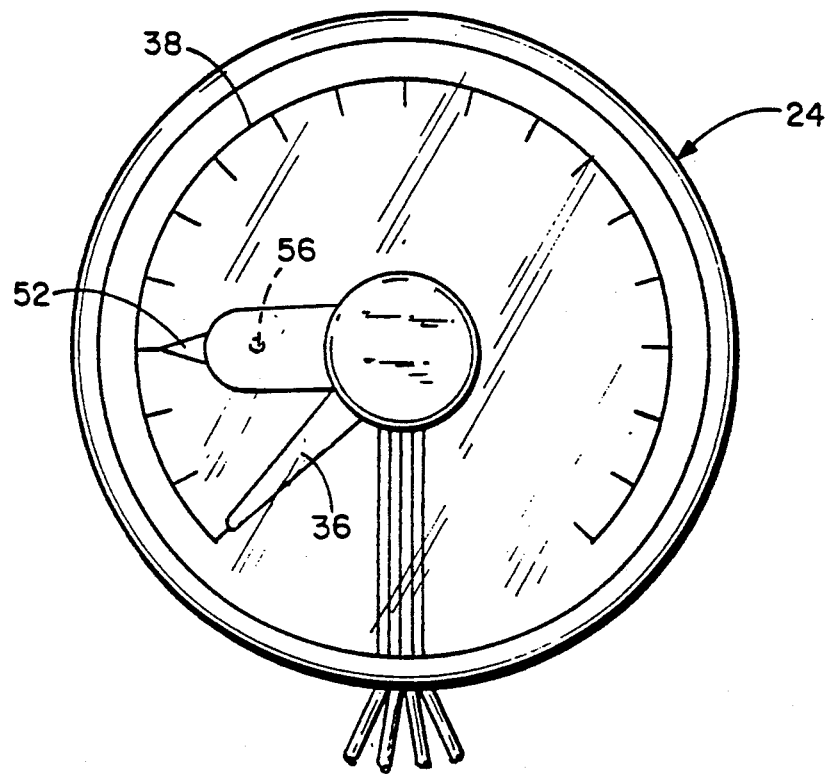
FIG. 5 is a diagrammatic plan view of the pressure gauge at the start of a tire inflation operation.

Referring next to the pressure gauge 24 which is shown in more detail in FIGS. 2 and 3, this comprises a base 30 having an inlet fitting 32 attached to an air-tight fashion to the branch pipe 22. Within that base 30 is a conventional mechanism including, for example, bellows and a gearing mechanism to convert expansion and contraction of the bellows according to the pressure in the supply pipe 22 into a rotary movement which is output to an upright stem 34. The operation of such a pressure gauge is entirely conventional and again will not be further described.

Attached to the upright stem 34 is a pointer 36. This cooperates with one or more scales 38 marked on an intermediate board 40 through which the upright stem 34 projects. According to the pressure in the branch pipe 22, the pointer 36 will rotate and become a signed with particular figures on the scales 38 so giving an indication of the then pressure within the pipe 22. Again such an arrangement is entirely conventional.

Covering the base 30 is a transparent dome 42 through which a user can observe the readings of the pointer 36 against the scales 38.

Centrally mounted at the top of the dome 42 is a rotatably pivotable sensor device 44. This includes a head 46 on the outside of the dome by means of which the device can be manually rotated, integrally formed bearing portion 48, a housing 50 and finally an integrally formed pointer 52. Within the housing 50 is positioned a photosensor 54 and in the underside of that housing is small opening 56. To the underside of the rotatably pivotable sensor device 44 is mounted a small electric bulb 57. The latter is connected by wires 58 to the power supply and the photosensor is itself connected by wires 60 to a controller as will be described.

As will be appreciated, the user can twist the rotatably pivotable sensor device 44 by turning the head 46 so that the pointer 52 points to a selected inflation pressure on the scales 38 which is chosen as the pressure to which a pneumatic tire is to be inflated. Then the compressor 12 will be stopped, as will be described below, once the actual inflation pressure indicated by the pointer 36 reaches that pre-set pressure.

Figure 4:
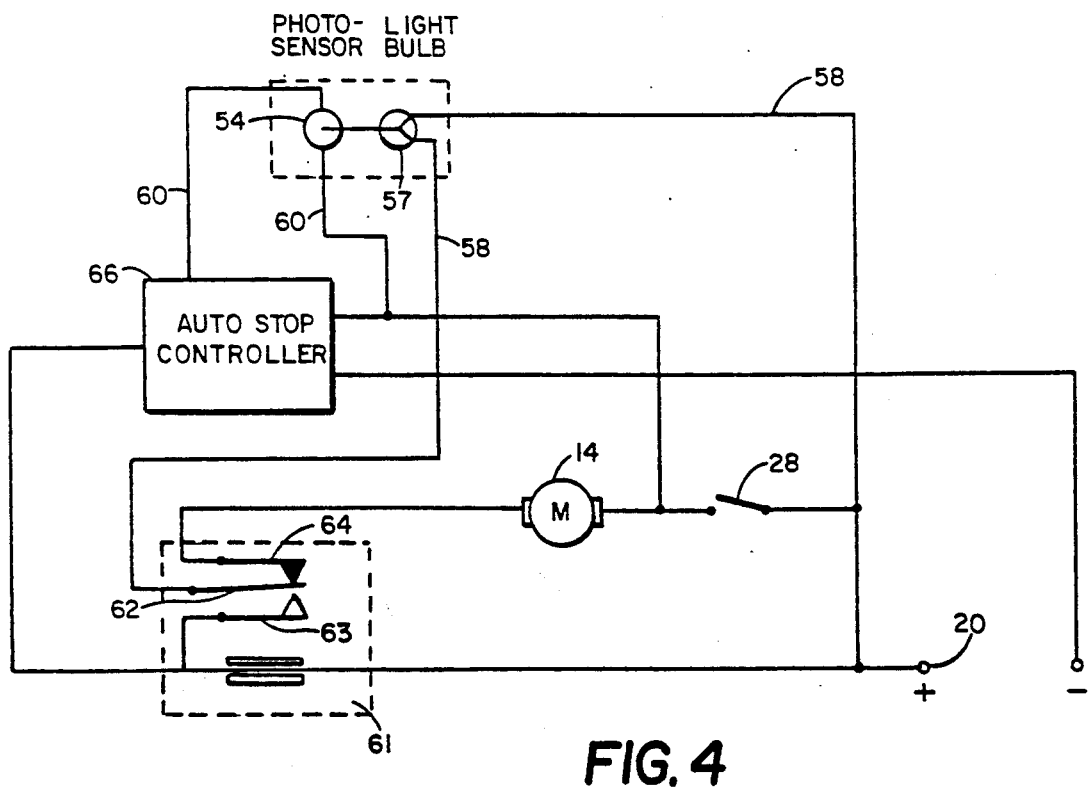
FIG. 4 is a circuit diagram of the circuit within the car compressor shown in FIG. 1.

Turning next to FIG. 4 this shows the electrical connections. A relay 60 is provided and in its deactivated condition this provides a connection between the central reed 62 and a switch contact 64. As a result, when the car compressor 10 is attached to a car's battery and the main switch 28 closed, the motor 14 will be activated and so drive the compressor 12.

Also once the car compressor 10 is connected to the car's battery the light bulb 57 will automatically be illuminated and its illumination will light up the area of the scales 38.

Also positioned within the casing 26 is a controller 66. This is attached by the wire 60 to the photosensor 54 and when the output from the photosensor 54 changes as will be described, the controller will provide an output to energize the relay 60. As a result, the central reed 62 will now disengage from the switch contact 64 and engage a contact 66. This will have the result of continuing the energization of the relay but will at the same time stop further operation of the motor 14. Thereafter the motor 14 cannot be re-started until the main switch 28 is opened ready to inflate a fresh tire.

Figure 6:
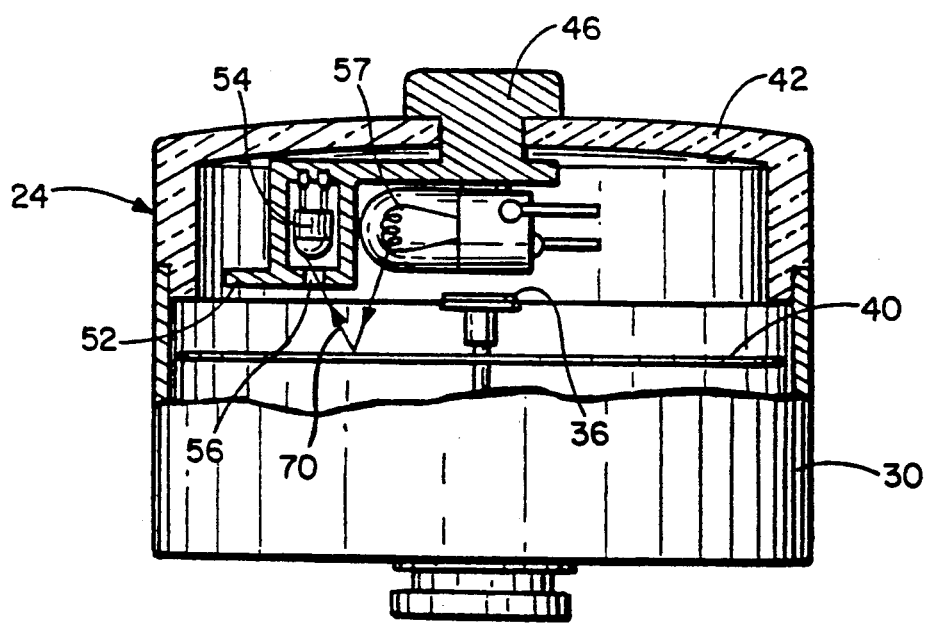
FIG. 6 is a diagrammatic upright sectional elevation of the pressure gauge.
Figure 7:
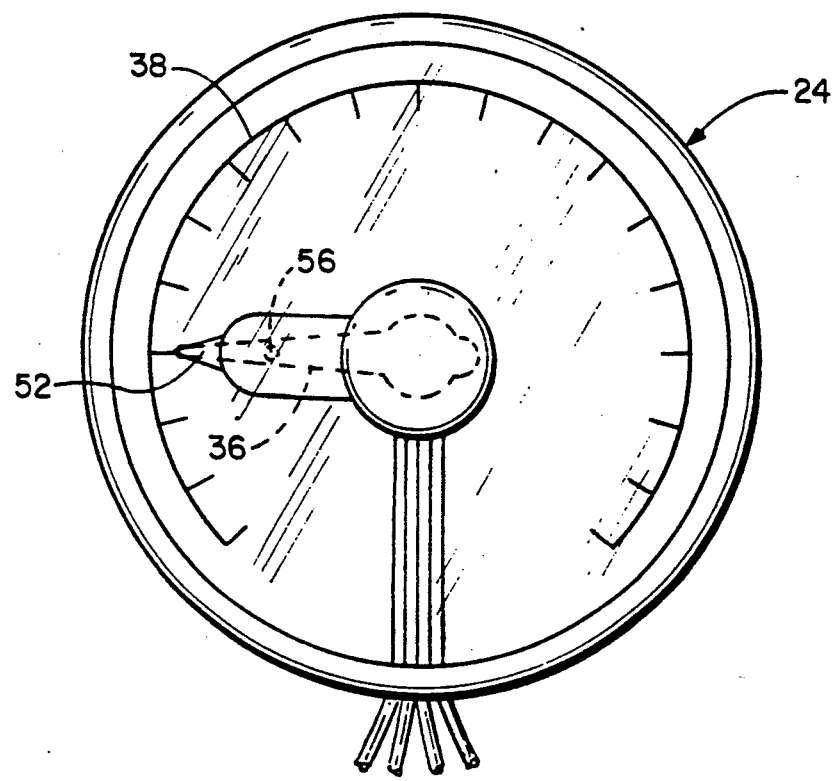
FIGS. 7 and 8 are views similar to FIGS. 5 and 6, respectively, showing the pressure gauge at the time when the inflation pressure reaches the chosen pre-set pressure.
Figure 8:
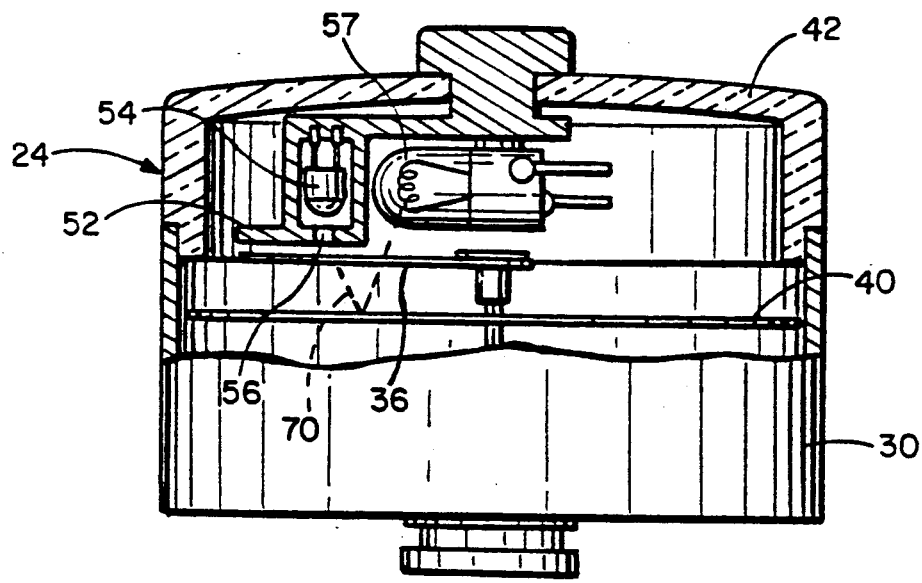

FIGS. 5 to 8 show in more detail the way in which the photosensor 54 works. Initially the pressure indicate by the pointer 36 will be zero whilst the pressure pre-set by the user is some figure higher than this, shown for example in FIGS. 2, 5 and 7 to be about 40 pounds/in$^2$. The pointer 36 is therefore well clear of the opening 56 and light from the bulb 55 will readily be reflected through the opening 56 and be received by the detector 54 along the lines of the light rays 70 which are indicated in FIG. 6. In that connection the hole 56 needs to be relatively small so as to restrict the amount of light which can enter and it should be of smaller diameter than the width of the pointer 36. By keeping the holes small, one can reduce the influence of sun light or other strong lighting on the system and predominantly the light received will be the light rays 70 reflected from the intermediate board 40.

The photosensor 54 can, for example, to be a photoresistor whose resistance will decrease as the intensity of light falls on it increases. Therefore initially it will have a relatively low resistance and this will be detected by the controller 66 which will remain non-conductive and so not allow the relay 60 to be energized.

As the tire becomes inflated the pressure indicated by the pointer 36 will increase and this will progress round the scale until at the chosen pressure it will become aligned with the pointer 52 and obscure the opening 56. As can be seen from FIG. 8 the light rays 70 are now blocked by the pointer 36.

As a result there is a large change in the light intensity received by the photosensitive detector 54 and its output resistance suddenly increases. As a result the controller now detects this and energizes the relay 60 so stopping the motor 14 and therefore preventing further inflation of the tire.

As will be appreciated, the arrangement according to the invention is extremely simple in that only a relatively few additional parts are required and only a slight modification of the pressure gauge 24 is necessary.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A compressor for inflating the tires of a vehicle, comprising:
    an electrically operated air compressor;
    means for driving said compressor from the vehicle's electrical supply;
    an outlet lien from said compressor to a vehicle tire;
    a pressure gauge for reading the pressure in said outlet line, said pressure gauge including a dial and a moving indicator to indicate instantaneous pressure;
    a pointer member movably mounted on said pressure gauge including a tip to be aligned upon movement of said pointer member, to a pre-set chosen final pressure;
    a light emitter carried by said pointed member to illuminate the area of said dial;
    an enclosure within said pointer member provided with a single small opening for the passage of light reflected from said dial into said enclosure, said opening being positioned close to he path of movement of said moving indicator so that said indicator substantially obscures the opening when said indicator points to said chosen final pressure, said opening being additionally positioned so as to prevent the direct passage of light from said light emitter into said enclosure;

photoelectric sensing means positioned in said enclosure for detecting the level of light entering the disclosure through said opening, and for providing an output signal when the light level is reduced by he alignment of said moving indicator with the opening; and means for deactivating said compressor when said photoelectric sensing means provides said output signal upon the alignment of said indicator with said chosen final pressure.

2. A vehicle compressor according to claim 1 in which said pressure gauge comprises a circular dial with a scale having radial markings to indicate pressure, and wherein said indicator is a rotatably mounted pointer having a tip which moves around he dial according to the pressure sensed.

3. A vehicle compressor according to claim 1 further comprising a relay controlling the energization of said motor, controller means for receiving an output from said photoelectric sensing means, and provide an output to control said relay, whereby a charge in said output from said photoelectric sensing means will switch said relay to deactivate said motor.

* * * * *